US011743846B2

(12) United States Patent
Annavajjala et al.

(10) Patent No.: US 11,743,846 B2
(45) Date of Patent: Aug. 29, 2023

(54) SOUNDING SIGNALS FOR SUB-METER BASE STATION LOCALIZATION

(71) Applicants: Parallel Wireless, Inc., Nashua, NH (US); PhasorLab, Inc., Billerica, MA (US)

(72) Inventors: Ramesh Annavajjala, Nashua, NH (US); Efi Dror, Kadima-Zoran (IL); Steven Paul Papa, Windham, NH (US); Joshua C. Park, Billerica, MA (US); Soumendra Nanda, Billerica, MA (US); Prashanth Rao, Wilmington, MA (US)

(73) Assignees: Parallel Wireless, Inc., Nashua, NH (US); PhasorLab, Inc., Nashua, NH (US)

(*) Notice: Subject to any disclaimer, the term of this patent is extended or adjusted under 35 U.S.C. 154(b) by 0 days.

(21) Appl. No.: 17/323,772

(22) Filed: May 18, 2021

(65) Prior Publication Data
US 2021/0360552 A1    Nov. 18, 2021

Related U.S. Application Data

(60) Provisional application No. 63/026,189, filed on May 18, 2020.

(51) Int. Cl.
*H04W 56/00* (2009.01)
*H04W 88/16* (2009.01)
(Continued)

(52) U.S. Cl.
CPC ......... *H04W 56/001* (2013.01); *H04L 5/0048* (2013.01); *H04W 16/32* (2013.01); *H04W 48/16* (2013.01); *H04W 88/16* (2013.01)

(58) Field of Classification Search
None
See application file for complete search history.

(56) References Cited

U.S. PATENT DOCUMENTS

2006/0014548 A1*  1/2006  Bolin .................. G01S 5/02
                                              455/456.1
2017/0079006 A1*  3/2017  Li .................... H04W 64/00
                          (Continued)

OTHER PUBLICATIONS

3GPP TS 36.305 V16.0.0, Mar. 2020, pp. 17-19 (Year: 2020).*
(Continued)

*Primary Examiner* — German Viana Di Prisco
(74) *Attorney, Agent, or Firm* — Michael Y. Saji; David W. Rouille

(57) ABSTRACT

Systems and methods are disclosed for providing base station localization. In one embodiment the system includes a network including a base station such as a 5G gNodeB (gNB); a Hetnet Gateway (HNG) in communication with the gNB, wherein the HNG includes a location server and wherein the HNG virtualizes and abstracts a collection of base stations and provides a complex network under its purview as a simple base station to a mobile packet core network; a plurality of Hyper Sync Network (HSN) nodes in communication with the gNB and the HNG, wherein the plurality of HSN nodes listen to User Equipments (UEs) to locate the UEs and to synchronize clocks on the gNB with the collection of HSN nodes or other gNBs; and an Evolved Serving Mobile Location Center (E-SMLC) server in communication with the HNG and for reporting the location of a UE.

19 Claims, 7 Drawing Sheets

(51) Int. Cl.
*H04W 48/16* (2009.01)
*H04L 5/00* (2006.01)
*H04W 16/32* (2009.01)

(56) References Cited

U.S. PATENT DOCUMENTS

| | | | |
|---|---|---|---|
| 2018/0049275 A1* | 2/2018 | Agarwal | H04L 65/65 |
| 2021/0266859 A1* | 8/2021 | Yu | H04B 17/27 |
| 2021/0337496 A1* | 10/2021 | Da | H04W 56/005 |
| 2022/0159414 A1* | 5/2022 | Balasubramaniam | H04L 5/0048 |

OTHER PUBLICATIONS

"RAT-dependent DL & UL NR positioning techniques", 3GPP TSG RAN WG1 #96, Athens, Greece, Feb. 25-Mar. 1, 2019, Qualcomm Incorporated.

"RAT Independent and Hybrid Positioning Solutions", 3GPP TSG-RAN WG1 Meeting AH1901, Taipei, Taiwan, Jan. 21-25, 2019, Qualcomm Incorporated.

Fischer, "Observed time difference of arrival (OTDOA) positioning in 3GPP LTE", Jun. 6, 2014, Qualcomm Technologies, Inc.

"Discussions on Potential Techniques for NR RAT independent Positioning", 3GPP TSG RAN WG1 #96, Athens, Greece, Feb. 25-Jan. 1, 2019, LG Electronics.

"On single-BS positioning technique", 3GPP TSG RAN WG1 Ad-Hoc Meeting 1901, Taipei, Jan. 21-25, 2019, Huawei, HiSilicon.

* cited by examiner

SOUNDING SIGNALS FOR SUB-METER BASE STATION LOCALIZATION

CROSS-REFERENCE TO RELATED APPLICATIONS

This application claims priority under 35 U.S.C. § 119(e) to U.S. Provisional Pat. App. No. 63/026,189, filed May 18, 2020, titled "Sounding Signals For Sub-Meter Base Station Localization" which is hereby incorporated by reference in its entirety for all purposes. This application also hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety.

BACKGROUND

Current approaches for positioning, navigation and timing (PNT) inside a warehouse are not sufficient.

4G: Best in class 4G LTE-based localization (without use of WiFi or GPS) is around 500 feet (typically it is much worse in practice).

5G: has five times the bandwidth as 4G, and even the best solutions claim at best 50 feet of theoretical location error. None of these approaches are suitable for warehouse localization. A promising theoretical approach promises at best 10 feet accuracy using a single base station. In our baseline solution, we estimate our approach provides sub-meter accuracy or within 3 feet, and our approach and coverage area can be further improved with additional PACE listening nodes.

RFID: is a commercially popular approach that is low cost but has very short range. Passive ID has very short range and location error is high (RFID tag is "somewhere in vicinity" of RFID tag reader). Active RFID has better range ("somewhere in this large room") but does not solve the location problem.

Wi-Fi and Bluetooth based tracking has better range (50 feet) and strong accuracy but does qualify as a 5G-solution, nor does it have our proposed accuracy (unless when combined with our HSN technology).

SUMMARY

A 5G Hyper Sync Localization (HSL) system is disclosed that enhances 5G gNodeBs to demonstrate sub-meter (better than LTE or the 5G standard) localization accuracy of standard and unmodified 5G signal sources from User Equipment (UEs) by enabling ultra-high precision time synchronization between 5G cellular base stations, without using any additional wired infrastructure. As a further enhancement we offer the ability to geolocate WiFi devices, with the same accuracy using the same hardware platform.

In one embodiment, a system providing base station localization includes a network including a base station; a Hetnet Gateway (HNG) in communication with the base station, wherein the HNG includes a location server and wherein the HNG virtualizes and abstracts a collection of base stations and provides a complex network under its purview as a simple base station to a mobile packet core network; a plurality of Hyper Sync Network (HSN) nodes in communication with the base station and the HNG, wherein the plurality of HSN nodes listen to User Equipments (UEs) to locate the UEs and to synchronize clocks on the base station with the collection of HSN nodes or other base stations; and an Evolved Serving Mobile Location Center (E-SMLC) server in communication with the HNG and for reporting the location of a UE.

In another embodiment a method for providing base station localization includes receiving, at a Hetnet Gateway (HNG) from an Evolved Serving Mobile Location Center (E-SMLC) server located in a network, a request for a location of a User Equipment (UE); issuing, by the HNG to a base station instructions to schedule a Sounding Reference Signal (SRS) transmission for the UE; issuing, by the HNG, instructions to a plurality of Hyper Sync Network (HSN) nodes to listen for the SRS transmission from the UE; transmitting, by the UE at an appointed time, the SRS transmission; listening, by the HSN nodes, for the SRS transmission and estimating a delay in receiving the transmission against a reference time; reporting, by the HSN nodes, the delay as metadata to the HNG; determining, by the HNG from the metadata, a location of the UE relative a location of the base station; and reporting, by the e-SMLC, the location of the UE.

In another embodiment a non-transitory computer-readable media containing instructions for providing base station localization which, when executed, cause a system to perform steps comprising receiving, at a Hetnet Gateway (HNG) from an Evolved Serving Mobile Location Center (E-SMLC) server located in a network, a request for a location of a User Equipment (UE); issuing, by the HNG to a base station instructions to schedule a Sounding Reference Signal (SRS) transmission for the UE; issuing, by the HNG, instructions to a plurality of Hyper Sync Network (HSN) nodes to listen for the SRS transmission from the UE; transmitting, by the UE at an appointed time, the SRS transmission; listening, by the HSN nodes, for the SRS transmission and estimating a delay in receiving the transmission against a reference time; reporting, by the HSN nodes, the delay as metadata to the HNG; determining, by the HNG from the metadata, a location of the UE relative a location of the base station; and reporting, by the e-SMLC, the location of the UE.

DETAILED DESCRIPTION

Figure 1:
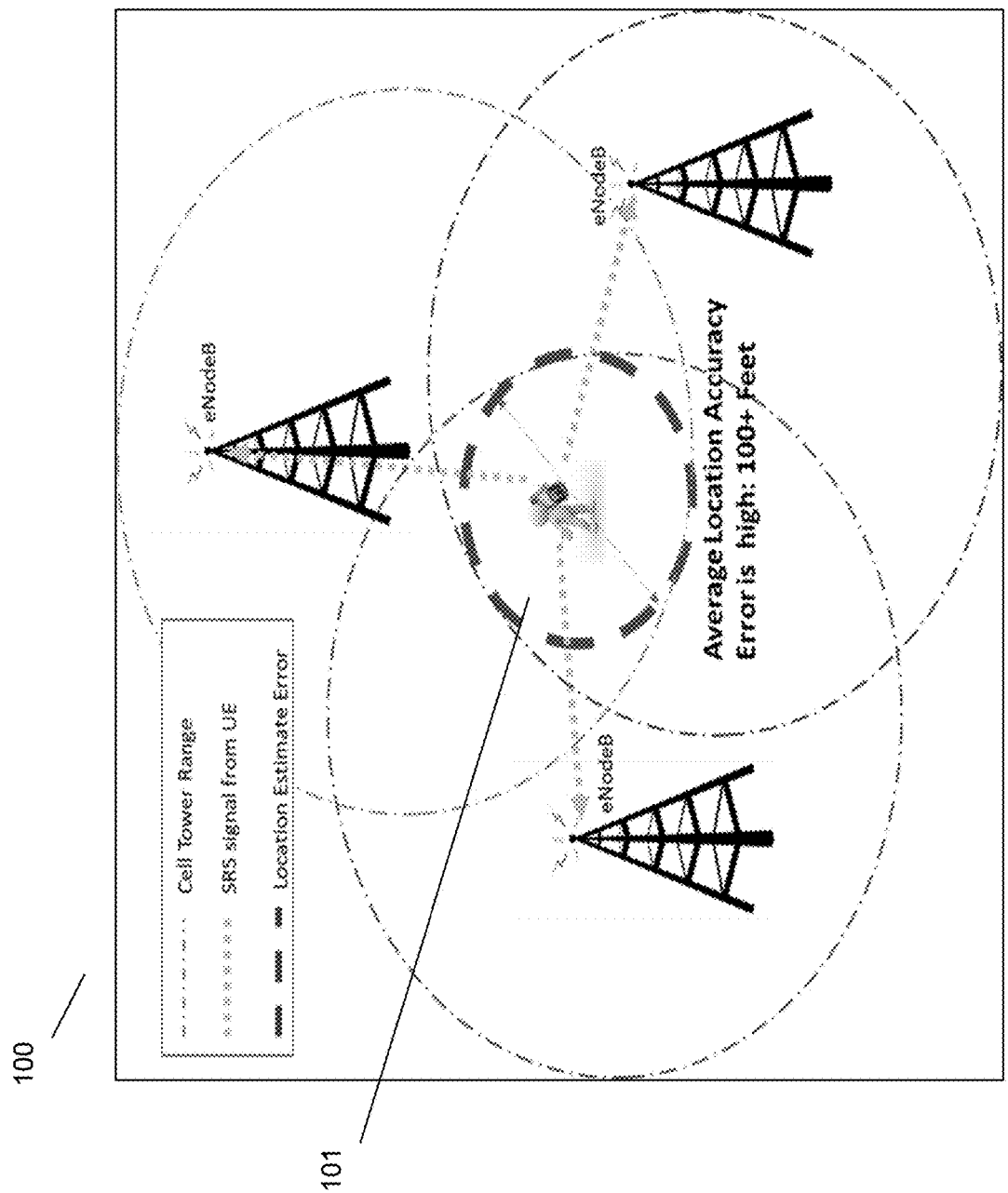
FIG. 1 is a diagram showing cell tower location estimation.

Sounding Reference Signals (SRS) that UE transmits for the sake of Channel Estimation and other needs can be used to measure the Time of Arrival at Base Stations. 5G seems to have expanded the SRS features so that it can occupy wider bandwidth (BW) and multiplex to capture multiple users at once, etc. This allows a good means to do Uplink TDOA for UE positioning without requiring any UE involvement. In order to realize this network-based high-precision positioning the following features would be required.

All the listening BSs will need to be highly Time Synchronized—PhasorLab's HSN is an excellent candidate for this need (Wireless 1588 so to speak). U.S. patent application Ser. Nos. 14/043,789, 15/235,052, and 15/495,972 are hereby incorporated by reference in their entirety.

Since it's likely that there are not enough BSs to produce TDOA measurements for a given UE location, we'd like to propose to deploy "Listening-Only Base Stations" which is part of the network but only responsible for (a) maintaining Time Sync and (b) measuring the arrival time of UE signals based on their SRS packets.

These time stamping data can be sent to eNB or other main network server to run positioning algorithms and compile position data for all UEs.

The Sync and Localization Problem: Modern cellular base stations use microsecond-level time synchronization between each other. Our team's breakthrough innovation is our ability to enable nano-second level sync wirelessly (1000× better time resolution than LTE). This is the fundamental building block of our proposed new innovations realized by HSL.

GPS does not work everywhere, and in general it is not accurate indoors or underground. GPS can be jammed or spoofed by even amateur hobbyists today. There is a strong interest in securely tracking location of individuals today, because of the risk of infection from others we come with 6 feet of contact for new diseases such as COVID-19.

Location or position detection algorithms that do not use GPS typically measure the time it takes to travel from UEs to multiple base stations. Most algorithms require at least three base stations to cooperate to determine location. HSL does too, but instead of expensive full base stations, we augment our location coverage areas of interest with inexpensive wireless HSN-nodes that act as 5G listeners or sniffers. Thus our solution needs only one HSL-compatible gNodeB and at least 2 more HSN devices in the range of the 5G UE that we wish to track.

The sync quality between base stations (4G, 5G, and even Wi-Fi), directly impacts estimation of location quality, because the accuracy of these algorithms are limited by the speed of cellular signals, which is the same as the speed of light. In 1 ns, light will travel 0.3 meters or just under 1 foot in distance. Thus, the higher the sync quality, the better the precision.

Location precision also depends on other factors such as the localization algorithm used, degrees of freedom, density of location sensors and geometry, indoor or outdoor use, and so forth. Most 4G cell towers use GPS-trained clocks that have 15 ns of drift at minimum. Even 5G base stations that will be connected by fiber optic will experience sync errors due to routers and other equipment in the path between them that can stretch to miles. Any solution that has more than 5 ns of sync accuracy cannot do better than 1 meter in location accuracy.

Team Innovations: Our 3GPP and ORAN-standards-compatible Hyper Sync Localization (or HSL) solution builds upon our team's innovative Hyper Sync Network (HSN) technology that has demonstrated jamming-resistant sub-nanosecond wireless time sync (without using fiber optic cable).

A new HSL solution is disclosed suitable for a ORAN-compliant 5G gNodeb. One key innovation of our approach is that we will not require any modification to 5G standards or 5G handsets or other User Equipment (UEs). In addition to providing better sync, a subset of HSL nodes will also double as additional 5G listen-only nodes which increases positional accuracy and coverage as needed especially in indoor scenarios.

In addition, our HSL proposal includes an innovative enhancement add-on using the same Hardware:

1) Localization of inexpensive WiFi tags. Wi-Fi chips are 10× cheaper than 5G UEs. They better range than RFID and allow secure bidirectional communications to enable next generation of smart Warehouse sensors. Imagine a $25 WiFi Tag that can securely warn the warehouse when the box it is sitting on is higher than a safe storage temperature, and also exactly where it is located.

2) Additional research into improved location accuracy for RF cluttered indoor environments through hardware level improvements that target both sync and location accuracy.

Innovative Claims

1) Sub-meter accuracy for 5G-only Cellular Localization (50× better than LTE, 10× over 5G spec)

2) Requires no modifications to UEs or 3gPP standards (All new features are implemented only in our gNodeBs and wireless HSN relays and will be industry-standard ORAN compatible)

3) Nano-second sync between 5G base-stations (current standard even for 4G/5G is 20 nano-seconds of sync errors due to reliance on GPS)

3) Fully Wireless Time Sync between 5G Base stations without using IEEE 1588 or fiber optic cables enables ad hoc remote/rural untethered 5G deployments (5G sync and localization solutions use expensive fiber optic cable)

Innovative Claims in Optional Enhancements:

1) Single gNodeB-based tracking using beam forming (Option 1)

2) WiFi-Tag tracking which is more accurate and cost effective (Option 2)

The inventors have previously invented the Hyper Sync Network (HSN), as sync platform which provides an alternative to GPS, and is also a time and frequency distribution system (TFDS) with sub-nanosecond accuracy and sub meter accuracy.

The Fundamental Problem: Where Am I? Where are You?

Today the world relies on location information to conduct commerce and warfare. Soldiers must be tracked for Situational Awareness (SA). Assets such as arms and equipment of all shapes and sizes must be tracked in warehouses and while on the move. In some applications, you want to track all your assets, while in others, you just need to self-localize and identify your own location in 2D or 3D space while indoor or outdoor.

There are many different ways to localize an asset. GPS and GNSS-based solutions are very popular and have enabled industries like Uber and will soon enable drone-based delivery services. The key benefit of GPS is low cost and outdoor accuracy, but the downside is lack of security against jamming and spoofing.

Thus, localization approaches independent of GPS are of critical interest.

Fortunately, there are multiple alternatives including Bluetooth/WiFi-based tracking and cellular localization for 4G/LTE and soon ubiquitous 5G systems.

Each alternative approach can be qualified on three dimensions:

1) Accuracy 2) Security 3) Cost

Cellular Localization: Today 4G LTE solutions without using the GPS module on the phone or WiFi localization, can use Time Difference of Arrival of UEs to geolocate them.

They can be triangulated and localized by multiple cell towers (example: during 911 call tracebacks) to within 100 meters of their actual location (at best due to 50 nanosecond sync accuracy).

In LTE, the max channel size is 20 Mhz, in 5G it is 100 Mhz. Based on this improvement and other algorithm advances, the 5G standard promises to improve location error to 20m. However, our team has yet to see demonstrations and confirmed 3rd party evaluation of this claim.

In addition, all cellular base stations today need a time-source reference clock to enable system level sync between towers and with each individual handset. Typically this is accomplished using GPS signals. An alternative is to receive a timing signal using the IEEE1588 standard over fiber optic cable or ethernet. The first approach is dependent on GPS availability and the latter is expensive. The third lesser known issue is clock accuracy/resolution and clock skew. If we can increase the accuracy of clock sync and resolution, we can immediately increase location accuracy. However the base 5G standard only allows microsecond level clock resolution and sync quality.

Our HSL Goal: We propose to significantly improve the ability to geolocate 5G devices without modifying User Equipment (UEs) to sub-meter level accuracy and the timing synchronization capabilities of 5G Base stations to sub-nanosecond accuracy. We also propose to implement our solution within the current 3gpp standards specification to ensure maximal compatibility of our proposed enhancement which requires hardware and software changes at the base station.

Warehouse Tracking and AR/VR Applications: Localization is particularly important for Warehouse Asset Tracking and for AR/VR.

Most warehouses rely on WiFi tags, IoT tags, Bluetooth sensors, RFID tags, barcodes, video tracking and more often than not manual tracking of assets.

Although most AR/VR systems rely on Infrared sensors, LIDAR, local beacons, 5G opens up new possibilities for global object locations that can be shared by multiple users in both indoor and outdoor scenarios.

Traditionally this is done using visual processing tools that are CPU intensive since each scene or view frame must be analyzed frame by frame (times two for stereo-vision camera sensors). To simplify the process, many companies provide "AR stickers" that are easy to detect. Our approach is to let object announce exactly where they are using 5G compatible SRS signals.

HSL Benefits: Using our HSL localization, we bring two distinct 5G advantages to AR/VR in addition to CPU-load reduction by avoiding and offloading video processing subroutines, and this reduced latency:

1) Every user knows exactly where they are with 50× more accuracy than LTE-based Time of Arrival estimates both indoors and outdoors, thus providing self-location context. Many VR exercises allow teams to move around in large indoor spaces and many AR demos are done in large indoor or outdoor spaces.

2) The second is that other 5G UEs (and optionally WiFi-tag equipped assets) can be located as they move. For military training exercises, imagine a Red force is moving, then blue forces can score a kill based on actual location on the body where a virtual missile will hit and not just within 100 feet of that target!

Similarly, location is important for many future AR/VR-supported applications. Using our localization this drone can now fly anywhere with cm level precision even without the drone's GPS sensors active. This is critical because GPS can be easily spoofed or jammed using COTS solutions that cost less than $300 to buy, but is illegal to use [https://www.kaspersky.com/blog/gps-spoofing-protection/26837/].

ORAN as 5G Disruption Catalyst: ORAN or Open RAN is a standardized interface that promotes interoperability and innovation across a wide swath of vendors and protocols. Thanks to ORAN, we even see Nokia and Ericson committing to making their previously closed off solutions interoperable with each other. Now different vendors can supply different parts of the cellular chain such as the Radio, the Baseband units and the Core. However, there is still a big gap between the potential of ORAN and capabilities especially on the hardware side of the equation such as 5G Radio Chipsets for base stations.

PhasorLab's patented Hyper Sync Net (HSN) technology for Position, Navigation and Timing (PNT) applications has been demonstrated to provide as high as picosecond level sync without using Atomic clocks.

Parallel Wireless and PhasorLab have collaborated to develop the design for a 4G Base-station that can operate without a GPS connection.

Challenge: 5G Location Accuracy Goal in Release 16 is sub-meter-level but does not specify how to reach it Innovation: HSL adapts our proven Hyper Sync Network (HSN) technology for 5G. HSN has demoed 30-cm accuracy from sub-nanosecond clock sync accuracy and is a 100% wireless solution to the US DoT in March 2020

Key benefits: High accuracy localization is the key to asset tracking and logistics. Current 4G/LTE provide only 100 feet of location error which is not viable for AR/VR applications without using GPS.

Challenge: Every cellular station needs a timing source to sync its local clock. Most use GPS or a wired protocol (e.g. IEEE1588)

Innovation: We provide a GPS-free Jammer-Resistant and fully wireless clock synchronization solution using HSN as a TFDS (Time and Freq Distribution System) for 5G base stations Key benefits: Jamming a GPS signal is trivial and costs only $300 in COTS hardware. Wireless HSN enables deployment in remote areas that do not have wired connections for IEEE 1588.

Challenge: Seamless connectivity between mobile nodes and dismounts needs location information for handoffs Innovation: Our solution enables fine grained localization and time sync across 5G base stations that may be miles apart without using expensive Atomic Clocks or adding fiber connections Key benefits: Knowing where any blue force UE provides full situational awareness and also helps with active beam steering and handovers for mobility Challenge: Adversaries are likely to jam GPS signals and cellular frequencies Innovation: In addition to active beam steering, tighter clock sync will enable agile frequency hopping strategies and our options enable precise localization of rogue signals The primary objectives of our 5G HSL project are:

Demonstrate sub-meter positioning accuracy utilizing our 5G HSL technology via:

Deliver High-Precision Wireless Synchronization Solutions (HSN) to 5G Network

Implement 5G Cellular Positioning System utilizing SRS packets for UTDOA-based Localization Technique Utilizing HSN for Network Synchronization Expand HSN roles to become extra listening nodes as part of the 5G network as well as being synchronization resource.

Expand HSL solution to track inexpensive WiFi devices using the same hardware (optional)

The inventors have contemplated solutions to the following challenges.

1. Computational Limits: What is the best accuracy possible on today's 4G and 5G hardware and best-in-class algorithms? The actual calculation done to estimate the location is typically done today in a central location that has information from multiple cell towers. How should it be done in a secure manner that is efficient and privacy friendly? Which parts of the compute can be distributed? How much communication overhead is needed?

2. Security and Privacy: One of the challenges not covered in our overview is that commercial cellular solutions have several privacy safeguards and legacy quirks.

3. Legacy Applications and Infrastructure: How should our system interact with the existing commercial location tracking services available and deployed already in the US and other countries. Can other vendors use our new innovations too?

The rest of this proposal document will go into more technical depth on how we achieve our objectives and plan to address all three of these challenges in our HSL approach.

Our goal is to minimize privacy risks, maximize accuracy and interface with popular location application solutions in use today.

2. Technical Background:

4G and 5G Localization Capabilities Today versus HSL:

The 4G and 5G standards have well defined Positioning Protocols to determine the position of connected User Equipment (UE). The current state of the art deployed in practical 4G systems provides positioning accuracies in the order of +−100m. 5G systems have the potential to increase the accuracy to the order of 10s of meters.

Uplink Time Difference of Arrival (UTDOA): One of the well-known approaches to locating a UE is to triangulate its position from a set of at least 3 (4 for fixing elevation in addition) sufficiently separated reference positions. If the reference positions are precisely known and the distance of the UE from each of these reference positions is also precisely known, the UE can be located precisely by mathematical methods. Uplink Time Difference of Arrival (UTDOA) is a specific method of implementing this concept. This is shown in system 100 of FIG. 1. Fundamentals of Cellular Time-difference of Arrival or TDOA-based Localization. Cellular UE could be anywhere in central circle 101 denoting the location estimation error.

In the UTDOA method, the UE is scheduled by the gNB/eNB to transmit a specific waveform. The listening nodes are synchronized tightly. Listening nodes are positioned at precisely known locations. The listening nodes decode the waveform and mark the time at which the waveform was received. Since the waveform originated from the UE at a common instant in time but was received by the listening stations at different instants in time due to difference in the distances the RF signal has to traverse to reach the listening stations, the relative difference in arrival times translates to the relative path length difference from the UE to each of the listening nodes. Thus, the ingredients required to triangulate the UE's position are available.

If the positions of the listening nodes are known with GPS co-ordinates, the UE's position can be known accurately in GPS co-ordinates. If the positions of the listening nodes are only known relative to one another, say when GPS is unavailable, the location of the UE can still be known relative to the position of the listening nodes.

PW's solution uses the UTDOA method but brings the following novelties:

High precision location of <1 m accuracy since the HyperSync Network synchronizes the timing on each of the listening stations extremely accurately.

The accuracy of estimation of relative time difference of arrival requires as little multipath dispersion as possible. PW's listening stations are inexpensive and can be deployed in appropriate numbers to have direct line of sight to the UE. In addition, our delay estimation algorithm utilizes Super Resolution Techniques on SRS special packets, which allows separating Direct-Line-of-Sight signal delay from the other multipath elements.

Unlike other synchronization mechanism, the Hypersync network nodes communicate wirelessly. Thus, it is perfectly suited for ad-hoc, just-in time, network-in-a-box type deployments in remote and hostile areas.

PW solution interfaces to upstream location-based services endpoints using 3GPP standards defined interfaces. This is critical so that existing location services used for 911 call location tracking continue to work seamlessly with HSL for maximal commercial viability of our solution.

PW solution can work with other waveforms distinct from 5G if so desired.

We now present some more details on HSN since it is a key enabling component inside the HSL solution as described above and realizing our class-leading sub-meter location accuracy.

HSN System Overview

Figure 2:
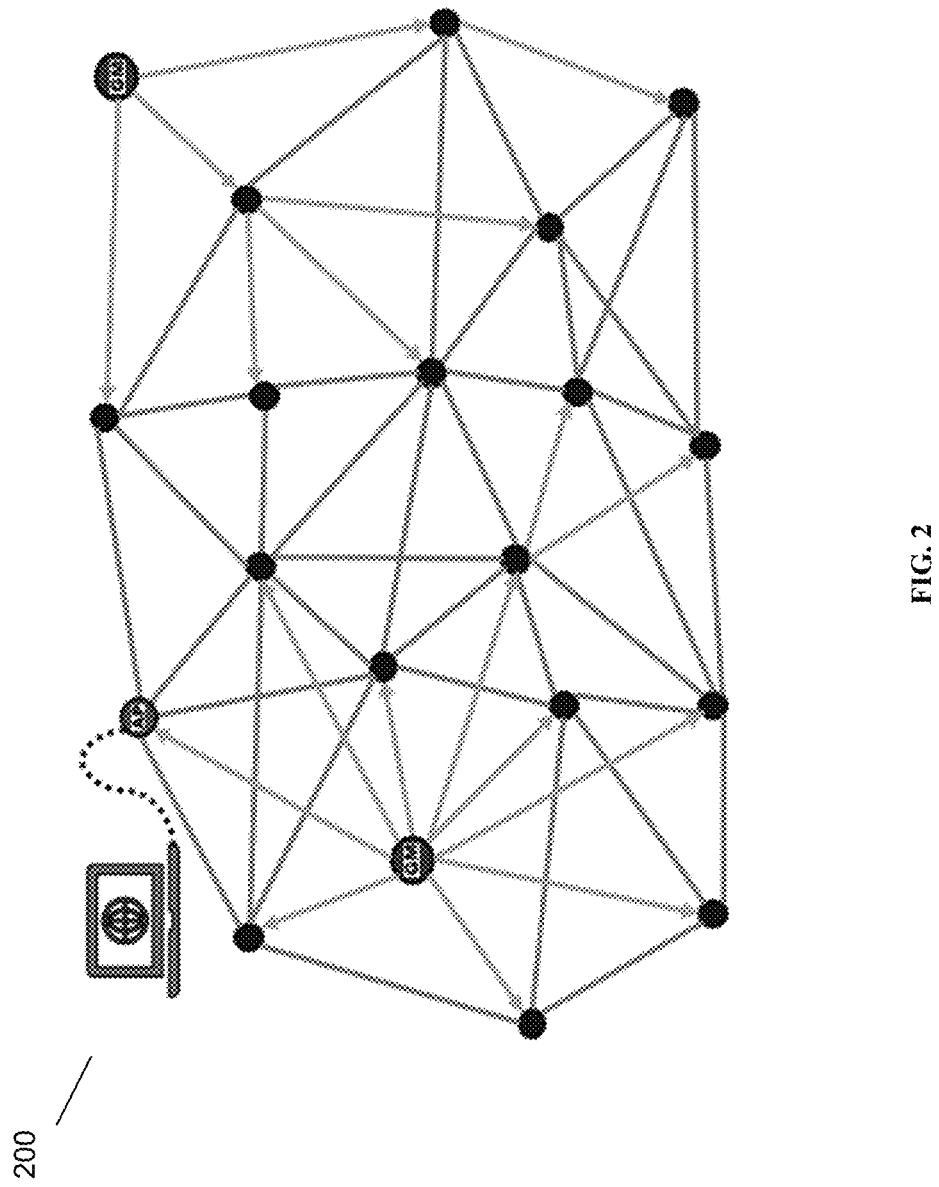
FIG. 2 is a diagram showing self-organizing hyper sync mesh network, in accordance with some embodiments.

FIG. 2 shows an example of a Self-Organizing Hyper sync Mesh Network 200. In this example the network is formed with two grand master nodes, a plurality of slave nodes and a plurality of access points.

Some of the unique features of our HSN are:

High-precision Blind Carrier Synchronization algorithm
Highly efficient high-resolution interpolation technique
High-precision delay estimation and time stamping techniques
Super-Resolution MP algorithm for multipath detection
Enhanced ranging resolution through frequency diversity
Self-Organizing, Mobile, High-Precision Time, Frequency Distribution System (TFDS)
Provides GPS-Independent APNT Solution to the entire mobile mesh network in real-time:
Highly Robust Against Jamming or Spoofing through: Synchronized Frequency Hopping, Self-Organizing, Self-Healing, and Redundant Mesh Architecture.
Instantaneous Doppler Shift measurement capability for accurate velocity tracking
Reduced cost and SWaP by eliminating the dependence on Chip Scale Atomic Clocks (CSAC) as Synchronization solution, and available as Battery-Powered Portable Units.
Fully Networking Ready: multi-hop, peer-to-peer packet exchange.

Our current uses HSN nodes and relays in the 2.4 GHz band. In this project, we proposed to explore different designs to integrate HSN with PW's 5G gNodeB using open source 4G and 5G gNodeB solutions, thus bringing our synchronization and localization capabilities to 5G products and solutions.

| HSN Key Features | Benefits |
| --- | --- |
| Self-Organizing, Self-Healing Mobile, High-Precision Time, Frequency Distribution System (TFDS) | Provides GPS-Independent PNT Solution in real-time that is scalable and distributable |
| 3D Mapping Capability | 3-D map of the entire mesh network is constantly updated as a byproduct of maintaining high-precision synchronization throughout the Mesh Network |
| Low Cost and SWAP (5" × 4" × 1" in current form) | Affordable and portable, yet as accurate as much more expensive Chip-scale atomic clocks (CSACs ). Each HSN node costs less than $1000 |
| Self-Organizing, Self-Healing, Synchronized Frequency Hopping, Redundant Wireless Mesh Architecture | Proven resistance against jamming and spoofing attacks |
| Instantaneous Doppler Shift measurement capability. | Enables accurate velocity tracking |
| Frequency agnostic | Can be adapted for use in other frequency bands for underground applications or in conjunction with custom radios |
| Additional out of band Data Networking Capability | As an added bonus, HSN is capable of multi-hop, peer-to-peer packet and data transfers for additional C2 channel capabilities |

Our existing HSN solution has been tested over multiple hops within a mesh network utilizing conventional 2.4 GHz wireless channels while just using 15 MHz of bandwidth in a highly efficient manner. We can use either unlicensed (WiFi bands) or licensed radio channels. Our HSN solution effectively eliminates the need for expensive time-reference equipment such as atomic clocks, CSACs, GPS-trained OCXOs, etc., and provides an unlimited number of high-precision time and frequency reference nodes utilizing our economical wireless solution. In addition, our highly robust self-organizing and self-healing network features are well suited to deliver a highly reliable PNT solution that can withstand most traditional jamming or spoofing attacks.

Figure 3:
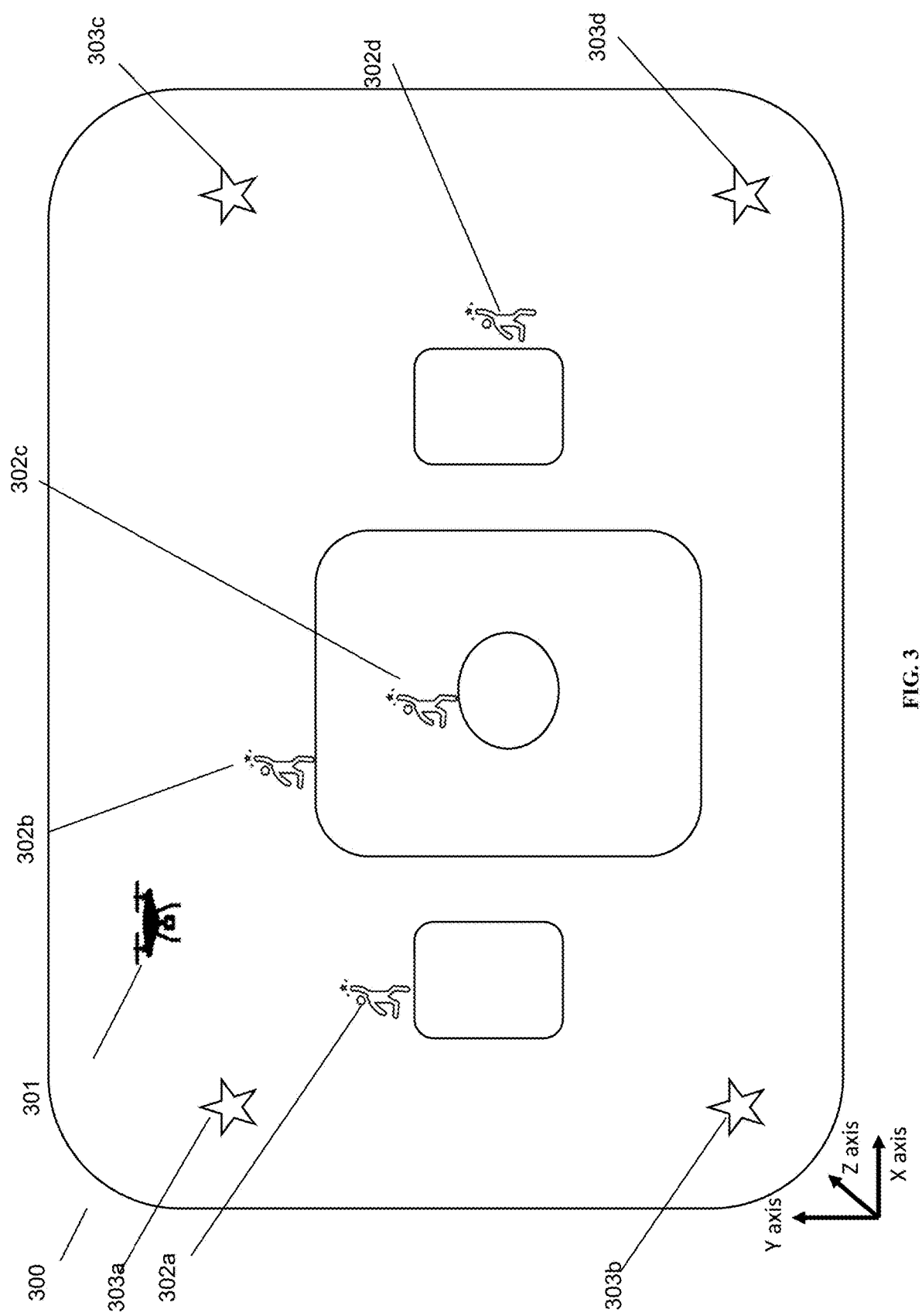
FIG. 3 is a diagram showing an example 3D position mapping capability, in accordance with some embodiments.

FIG. 3 shows an embodiment 300 of an HSN Football field demo using a drone 301 highlights our 3D position mapping capability with sub-meter-level accuracy. A group of people 302a,302b, 302c and 302d are shown at various locations on the field 300. HSN anchors are shown as stars 303a, 303b, 303c and 303d. The system allows any HSN node to act as an anchor or client or as both. HSN provides both timing and position localization capabilities.

HSN for High-Precision Cellular-Network UE Localization

Proposed use of HSN for 5G Cellular
HSN as Wireless Version of IEEE 1588
HSN as Listening Only Nodes
HSN Positioning Algorithm
Time Domain
Frequency Domain
Positioning Algorithm Research
HSN for Cellular Network Synchronization ("Wireless PTP")

There are two typical ways of achieving time synchronization for the cellular base stations. As the common first option the outdoor base stations are equipped with a GPS receiver which typically delivers up to tens of nanosecond synchronization. When GPS is not available the typical secondary alternative that is the IEEE 1588 Precision Time Protocol (PTP) which is a wired solution. Trying to achieve equivalent sync quality as GPS via IEEE 1588 is typically challenging and very expensive resulting in inferior sync quality more often than not. In contrast, our Hyper Sync Net can be deployed highly economically delivering superior synchronization qualities to the entire cellular network. Our solution results in actually better sync quality than the GPS-based solution. Since most of the base stations are not equipped with expensive GPS-trained crystals (OCXOs) the typical sync quality between BSs are tens of nanoseconds at best. Our HSN, on the other hand maintains virtual time and frequency lock between base stations; therefore, it is an ideal candidate for a secondary time source as a backup to GPS. Our HSN can be thought of as the "Wireless PTP" delivering superior outcome than wired IEEE 1588 version of PTP.

HSN for High-Precision Cellular-Network UE Localization

Sounding Reference Signals (SRS) that UE transmits for the sake of Channel Estimation and other needs can be used to measure the Time of Arrival at Base Stations. 5G seems to have expanded the SRS features so that it can occupy wider BW and multiplex to capture multiple users at once, etc. So, this gives us a good means to do Uplink TDOA for UE positioning without requiring any UE involvement. In order to realize this network-based high-precision positioning the following features would be required.

All the listening BSs will need to be highly Time Synchronized—PhasorLab's HSN is an excellent candidate for this need (Wireless 1588 enabler in a box ready for daisy chains).

Since it's likely that there are not enough BSs to produce TDOA measurements for a given UE location, we'd like to propose to deploy "Listening-Only Base Stations" which is part of the network but only responsible for (a) maintaining Time Sync and (b) measuring the arrival time of UE signals based on their SRS packets.

These time stamping data can be sent to eNB or other main network server to run positioning algorithms and compile position data for all UEs.

In one embodiment, system hardware consisting of SDR from Analog Devices and an FPGA. Each node of our Mesh Network uses identical hardware regardless of whether it's a master anchor or mobile UE. A few different antennas used are also shown along with a 10-foot tri-pot used for mounting anchor nodes.

Key innovation: "Sub meter Localization Accuracy for 5G gNodeB" system that does not require any UE modification by exploiting 5G SRS feature, will work with existing location services and privacy restrictions, allows improved coverage by "5G listen-optimized nodes" deployed as and when needed wirelessly, can use the same hardware to also perform sub-meter WiFi localization, and does not use GPS or other location sensors. The HSL 5G gNodeB is 100% ORAN-compatible as well.

Figure 4:
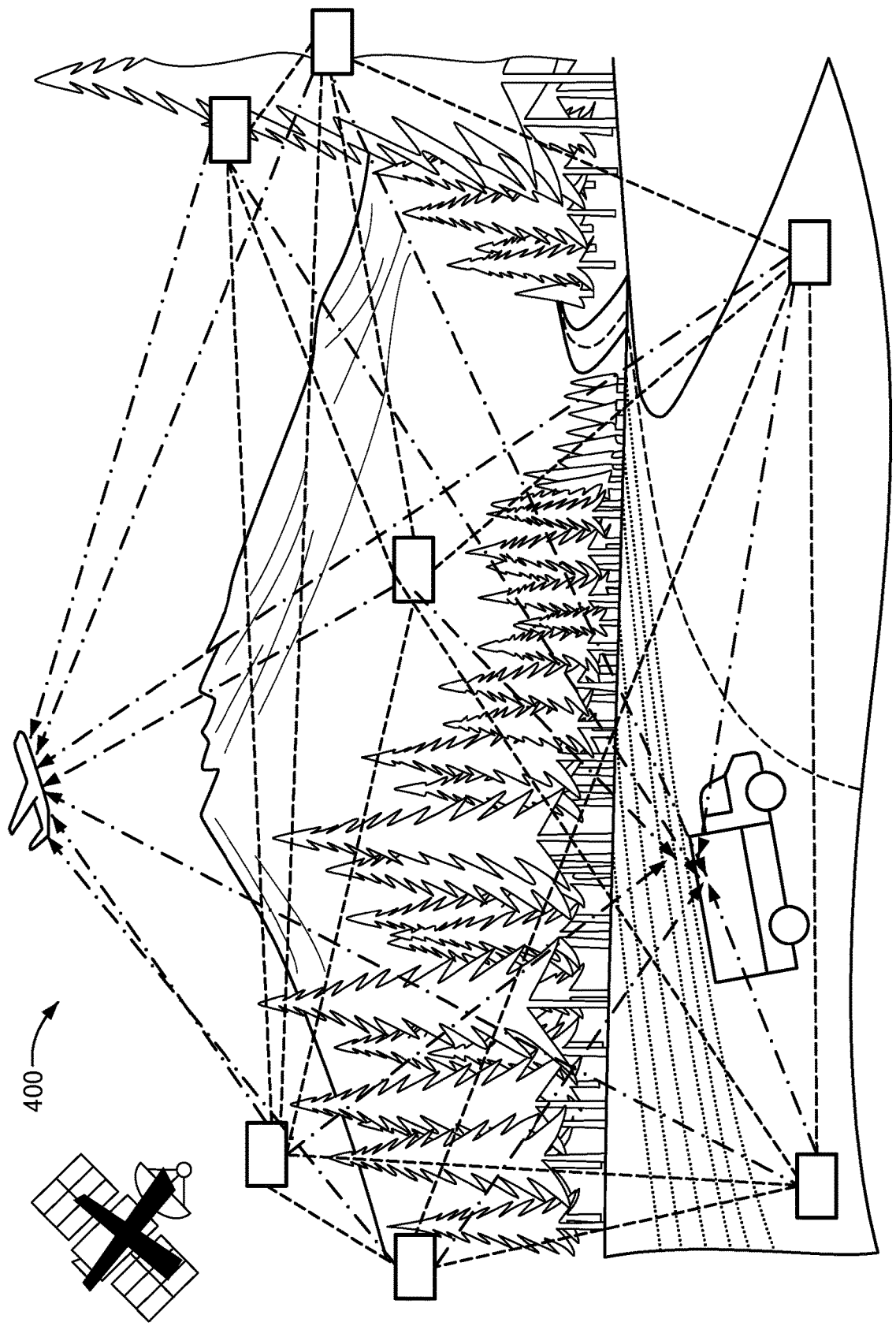
FIG. 4 is a diagram showing a T-GPS mode, in accordance with some embodiments.

How to improve 5G location without changing the 5G standard or UE: is shown in the environment 400 of FIG. 4. One of the most innovative aspects of our proposal is our ability to improve 5G location capabilities using our custom HSL solution, but without modifying 5G handsets or existing protocols. They key to this approach is understanding and exploiting the SRS capabilities of the 4G and now 5G 3gpp standards. Parallel Wireless is one of the few companies that can manufacture and modify both the software and hardware of the entire cellular stack. We present some fine-level details to highlight our knowledge of this domain and how we will apply it in this proposal.

SRS: Sounding reference signal (SRS) is a physical-layer waveform designed in 4G LTE for the UE to transmit in the uplink communication with the eNB. The SRS waveform is designed for multiple purposes: 1.) To enable the eNB learn the uplink channel conditions from its active users for both TDD and FDD as this allows the eNB in LTE and gNB in 5g, to perform uplink channel quality measurements, interference conditions determination, and frequency-selective scheduling. 2.) To enable closed-loop link adaptation between the UE and the eNB to optimally allocate the modulation and coding schemes and to increase the link efficiency for both TDD and FDD. The eNB does this by computing the signal-to-noise-plus-interference ratio (SINR) and then mapping this SINR to the target modulation and coding rate subject to the allocation (or the number of resource blocks used for the UE) constraint.

To compute the downlink precoder weights based on uplink SRS transmission by leveraging the channel reciprocity of a TDD carrier. This is a defining feature of TDD as due to subframe partition between the UE and the eNB, our goal is to reduce the signaling overhead in estimating the precoding matrix to be applied for downlink single-user and multi-user MIMO transmission. And most importantly: To enable high-resolution signal processing to estimate the angle of arrival (AoA), angle of departure (AoD) and the location of the user. This is possible because the SRS bandwidth can be configured by the gNB with a maximum SRS bandwidth equal to the LTE system bandwidth. For 18 MHz occupied LTE bandwidth with 20 MHz channel bandwidth, the one-way theoretical location accuracy is 16.6 meters.

The Sounding Reference Signals can be spaced at fixed spacing across the entire bandwidth. Think of it as fine toothed comb in the frequency domain spanning the entire bandwidth. In some embodiments, the listening devices would get information about a given UE's SRS waveform from the scheduler in the controlling base station and thereby, have the information to listen to the sounding signal. As the base station has the ability to ask for a sounding signal that consumes full carrier-width, this enables sounding signals to be used for positioning.

In some embodiments, listen-only base stations may also be used, so that the SRS method is able to be used by a listen-only node capable of 5G listening without requiring the full overhead of a 5G base station.

In our current product deployments, we already support the SRS for the purposes 1) through 3) above. As part of our current proposal, we plan to leverage SRS for precise location determination for proposed new 5G products in our design and development phase.

The SRS waveform in LTE is based on Zadoff-Chu sequences which have the property that the cross-correlation of the sequence with its non-zero cyclic shifts is identical to zero. For frequency-flat channels over the span of the SRS bandwidth, this property allows for unique identification of each SRS waveform, and subsequently precise time localization of the UE transmitting that SRS waveform.

Figure 5:
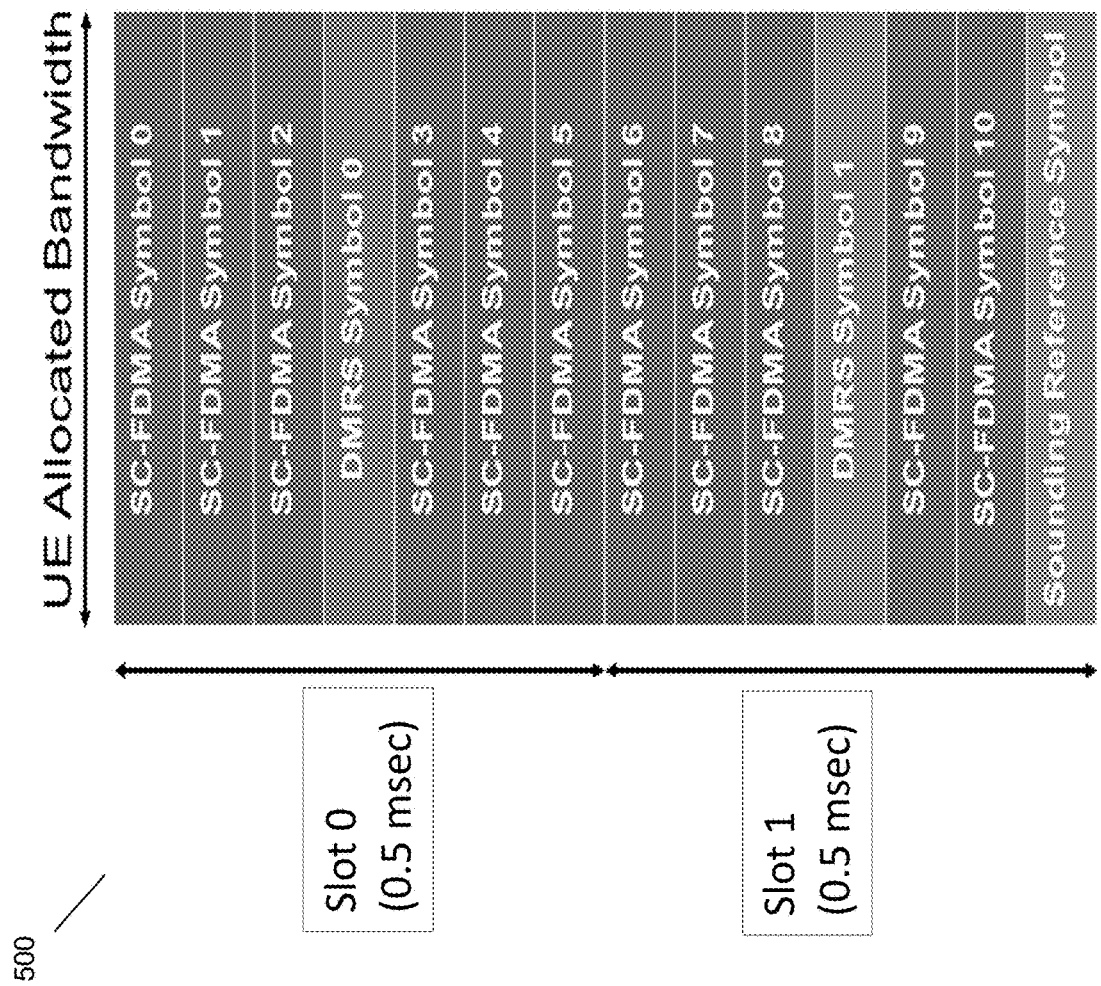
FIG. 5 is a diagram showing a subframe with SRS transmission, in accordance with some embodiments.

FIG. 5 shows the structure of a subframe with SRS transmission 500. Here, the LTE subframe is divided into two slots. The subframe duration is 1 msec whereas the slot duration is 0.5 msec. Each slot carriers 7 symbols out of which 6 symbols are to carry the data from the UE to the eNB while the central symbol in each slot contain the demodulation reference symbol that is exploited by the eNB to perform channel estimation, noise and interference estimation, and equalization. When the eNB configures the sounding reference signal, the last symbol in the 2nd slot is not used for data transmission. Instead, the last symbol in the second slot will be used to transmit the SRS waveform. Another point to keep in mind is that it is possible to only configure the SRS users with no data to transmit in which case only the SRS symbol will be transmitted in the last symbol portion of the subframe. The SRS transmission bandwidth can be configured to be either the same as different from the bandwidth used for data transmission. This distinction will be exploited in our proposal to realize high-accuracy location estimation for different users by dynamically changing the SRS bandwidth. For multi-antenna transmissions from the UE, SRS is expected to be transmitted from each transmit antenna. However, since LTE uplink is primarily limited to single-antenna transmission, in this proposal we too will first focus on the single-antenna SRS transmission.

Processing of the SRS waveform: The SRS waveform undergoes the same SC-FDMA modulation as the rest of the data channels (such as PUSCH and PUCCH). This waveform goes through a frequency-selective fading channel and is further corrupted by intentional interference (i.e., due to other UEs in the sector of interest) and unintentional interference (i.e., UEs in the other sectors), and then external jamming prior to perturbed by additive noise at the receiver frontend.

The received time-domain signal is processed through a series of low-noise amplifiers, filters, and A/D converters and then passed through a bank of FFT processors (one FFT per receive antenna) to obtain the frequency-domain received waveform. Only the tones within the allocated bandwidth are retained (i.e., 1200 loaded tones from a 2048 FFT for a 20 MHz LTE system). Since the eNB knows the allocation information (i.e., subframe number and resource block positions) of the SRS transmissions, it extracts the frequency-domain SRS symbols across all the receive antennas corresponding to the SRS allocation.

Ideally, the eNB can apply high-resolution signal processing (HRSP) algorithms such as MUSIC (multiple signal classification) or ESPRIT (estimation of signal parameters via rotational invariant techniques) to extract AoA, AoD, timing and distance information. However, to not computationally burden the eNB we propose to compress the SRS samples and transmit to a central processing unit for dedicated HRSP task.

To summarize, our team has studied this problem in depth and understand exactly how to build and a custom 5G gNodeB that will be optimized to provide unprecedented accuracy by coupling our knowledge of the SRS waveform that is standard in the 3gPP enhanced with our ability to synchronize time between multiple base stations at the sub-nanosecond level.

Putting it all Together: The Complete HSL System.

Now that we have described the fundamentals of our solution names HSN and SRS, we discuss how we will demonstrate HSL in a solution by integrating these complementary technologies into a custom HSL-ready 5G gNodeB. Our solution will work with just one base station but for best performance we require three of our nodes to enable signal triangulation.

Figure 6:
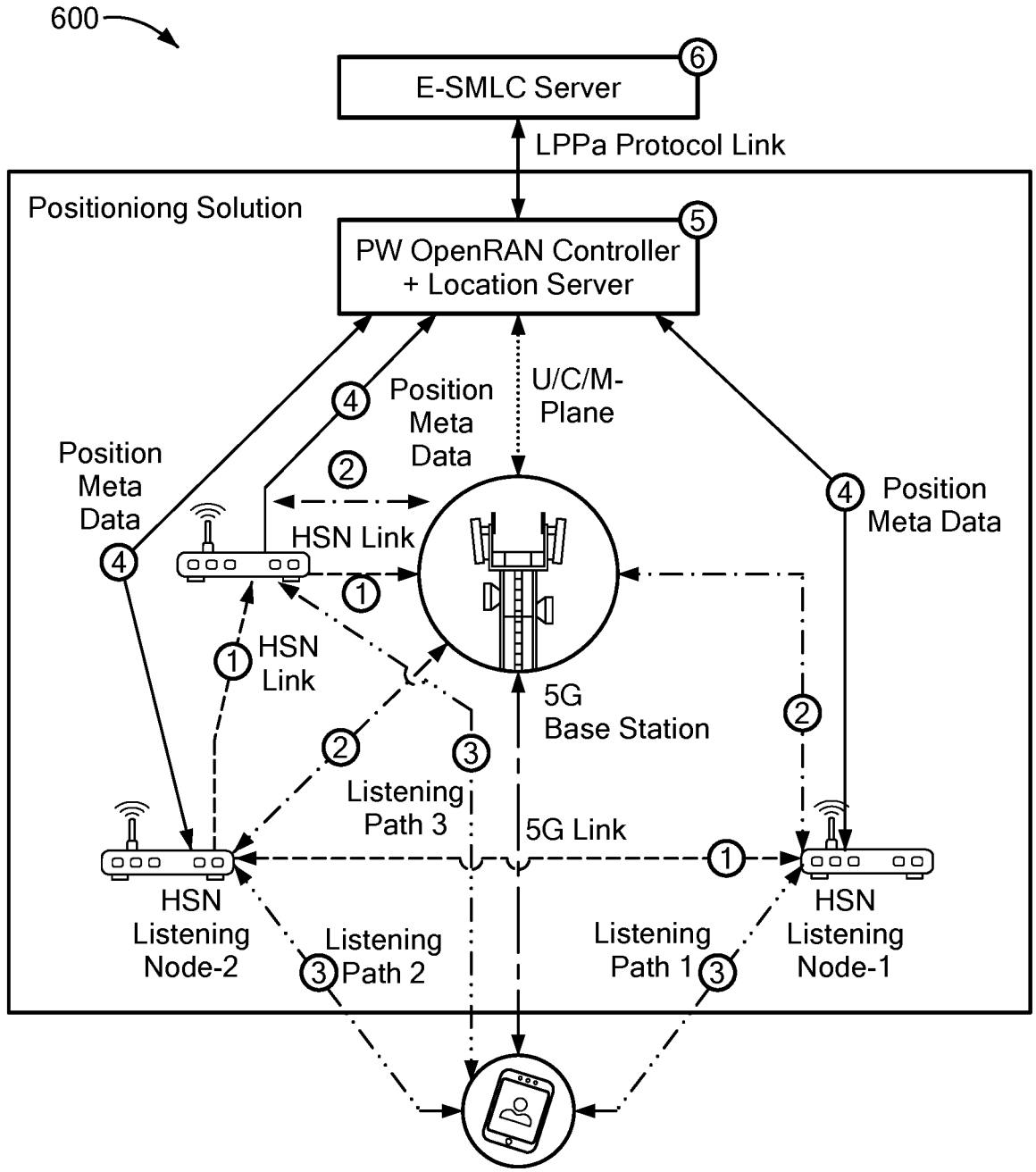
FIG. 6 is diagram of a HSL and SRS system, in accordance with some embodiments.

FIG. 6 shows the HSL solution 600 can be integrated into and deployed by any ORAN-compatible cellular OEM. The PW HSL assisted Location Services solution encompasses a system that interfaces to the 3GPP standards defined E-SMLC. The PW solution interfaces with the E-SMLC using the 3GPP standards defined LPPa protocol.

HSL Key Components: The HSL solution consists of the following components:

PW 5G gNB (also works with 4G).

PW Hetnet Gateway that virtualizes/abstracts a collection of PW base stations and provides the complex network under its purview as a simple base station to the mobile packet core network.

The PW HetNet Gateway is a software solution that runs on commodity servers.

The PW HetNet Gateway also hosts the Location Based Services Intelligence and Algorithms.

HSN Nodes that perform the dual role of listening to UEs for the purpose of locating the UEs and for synchronizing the clocks on the PW gNB with the collection of HSN listening nodes, or other gNBs.

HSL System Operation Workflow: The solution is architected as follows:

HSN network is always operational and keeps the clocks on the gNB and listening stations perfectly synced using a wireless channel to achieve this mechanism.

When the location of a UE is to be determined, a request arrives at the PW-HNG, 5, from the E-SMLC Server, 6.

The PW Location Server issues instructions to the gNB to schedule a specific waveform transmission for the UE of interest. This waveform is the Sounding Reference Signal, a standard defined UE uplink waveform.

The PW Location Server issues instructions to the listening nodes to listen for this imminent waveform.

At the appointed time, the UE starts transmission of the waveform. The listening nodes listen to the waveform and estimate the delay in receiving the signal against a common reference of time. The individual paths traversed by that identical waveform is shown in 3.

The listening nodes report the delay as metadata to the PW Location Server along wireless (or wired ethernet where available) paths 4.

The PW-location server pinpoints the location of the UE and conveys this information to the E-SMLC as a location relative to the PW gNB's location.

The E-SMLC proceeds to report the location of the UE as per its defined behavior.

Analysis of Expected HSL Geolocation Accuracy and Performance:

Using existing LTE positioning method as a comparison, below sample calculation highlights the expected improvements in positioning accuracy as we evolve toward utilizing Sounding Reference Signal (SRS) as the arrival time estimation and superior time synchronization proposed by adopting HSN for 5G. A good theoretical estimation of positioning errors in LTE network is compare to what we can expect utilizing our 5G solution with HSN in below sample calculations. The representative values used below for typical error sources in LTE solution comes from [Q3].

UE's OTDMA measurement uncertainty relying on time-stamping PRS signals from two base stations for LTE: $\sigma\_UE$=~40 m However, migrating to SRS-based positioning this uncertainty no longer comes into calculation as the new method relies on Uplink OTDMA.

Decent value for Geometric Dilution of Precision (GDOP) parameter which represents how well the listening base stations are positioned for a target UE: GDOP=0.9 We will use the same GDOP figure for comparison.

Base stations's synchronization accuracy for LTE: $\sigma_{BS}$=~15 m m For our solution, this number goes below 0.3 meters (less than 1 ns in time sync)

eNB's antenna coordinate accuracy: $\sigma_{ANT}$=~3 m. For our PACE solution this term will also vanish to a centimeter-level or better.

Expected Multipath excess delay to be ~0.1 us (suburban): $\sigma_{MP}$=~30 m. Our proposed solution also removes any multipath effects by virtue of phased array antennas as well as super resolution algorithms being adopted by the extra listening-only nodes.

Adding all these sources of errors together, LTE based solution gives:

$$\sigma_{SUM} = \sqrt{\sigma_{UE}^2 + \sigma_{BS}^2 + \sigma_{ANT}^2 + \sigma_{MP}^2} = \sim 52 \text{ m}$$

$$\sigma_{TOT} = GDOP \cdot \sigma_{SUM} = 0.9 \times 52 = \sim 47 \text{ m}$$

In comparison, our PACE+HSN solution, the positioning error estimates are:

$$\sigma_{SUM} = \sqrt{\sigma_{BS}^2 + \sigma_{ANT}^2 + \sigma_{MP}^2} = \sqrt{0.3^2 + 0.1^2 + 0.5^2} = \sim 0.59 \text{ m}$$

$$\sigma_{TOT} = GDOP \cdot \sigma_{SUM} = 0.9 \times 0.59 = \sim 0.53 \text{ m}$$

In comparison, for our PACE+HSN solution, the positioning error estimates are:

$$\sigma_{SUM} = \sqrt{\sigma_{BS}^2 + \sigma_{ANT}^2 + \sigma_{MP}^2} = \sqrt{0.3^2 + 0.1^2 + 0.5} = \sim 0.59 \text{ m}$$

$$\sigma_{TOT} = GDOP \cdot \sigma_{SUM} = 0.9 \times 59 = \sim 0.53 \text{ m}$$

Figure 7:
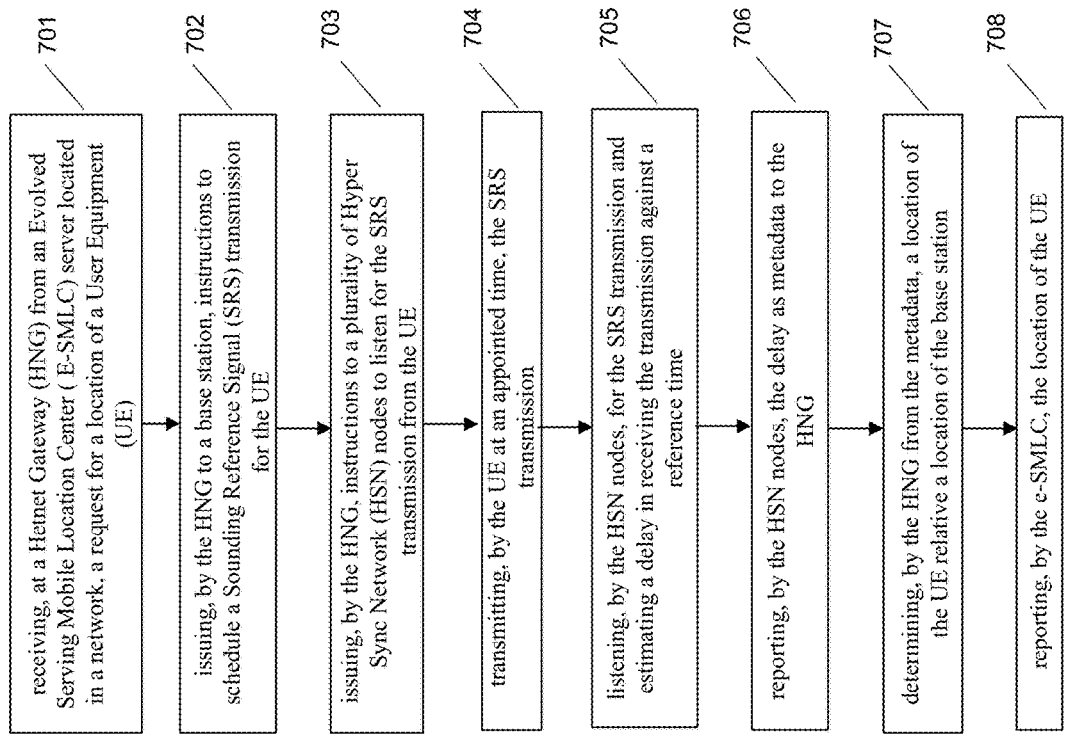
FIG. 7 is a flow diagram for sounding signals for sub-meter base station localization, in accordance with some embodiments.

FIG. 7 is a flow diagram of a method for sounding signals for sub-meter base station localization, in accordance with some embodiments. The method begins with processing block 701 which discloses receiving, at a Hetnet Gateway (HNG) from an Evolved Serving Mobile Location Center (E-SMLC) server located in a network, a request for a location of a User Equipment (UE). The HNG hosts location based services intelligence and algorithms.

Processing block 702 shows issuing, by the HNG to a base station, instructions to schedule a Sounding Reference Signal (SRS) transmission for the UE. the base station comprises a one of a 4G eNodeB and a 5G gNodeB (gNB).

Processing block 703 recites issuing, by the HNG, instructions to a plurality of Hyper Sync Network (HSN) nodes to listen for the SRS transmission from the UE. The HSN node comprises a listen only base station for maintaining time synchronization and an arrival time of UE signals.

Processing block 704 states transmitting, by the UE at an appointed time, the SRS transmission.

Processing block 705 discloses listening, by the HSN nodes, for the SRS transmission and estimating a delay in receiving the transmission against a reference time.

Processing block 706 shows reporting, by the HSN nodes, the delay as metadata to the HNG.

Processing block 707 recites determining, by the HNG from the metadata, a location of the UE relative a location of the base station.

Processing block 708 discloses reporting, by the e-SMLC, the location of the UE.

The clocks on the base station and HSN nodes are synchronized using a wireless channel.

In conclusion, by combining PhasorLab's HSN technology with PW's 5G Cellular Solution, and supported by analysis provided here, HSL will significantly advance the state of the art in 5G geolocation in GPS-denied and indoor environments and significantly benefit commercial customers from sub-meter or better accuracy.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, 5G, legacy TDD, or other air interfaces used for mobile telephony. 5G core networks that are standalone or non-standalone have been considered by the inventors as supported by the present disclosure.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols including 5G, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to 5G networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A system providing base station localization, comprising;
 a network including a base station;
 a Hetnet Gateway (HNG) in communication with the base station, wherein the HNG includes a location server and wherein the HNG virtualizes and abstracts a collection of base stations and provides a complex network under its purview as a simple base station to a mobile packet core network;
 a plurality of Hyper Sync Network (HSN) nodes in communication with the base station and the HNG, wherein the plurality of HSN nodes listen to User Equipments (UEs) to locate the UEs and to synchronize clocks on the base station with the collection of HSN nodes or other base stations; and
 an Evolved Serving Mobile Location Center (E-SMLC) server in communication with the HNG and for reporting the location of a UE.

2. The system of claim 1 wherein the base station comprises a one of a 4G eNodeB and a 5G gNodeB (gNB).

3. The system of claim 1 wherein the HNG hosts location based services intelligence and algorithms.

4. The system of claim 1 wherein the network keeps clocks on the base station and HSN nodes synchronized using a wireless channel.

5. The system of claim 1 wherein the HNG issues instructions to the base station to schedule a Sounding Reference Signal (SRS) transmission for the UE of interest.

6. The system of claim 5 wherein the HSN nodes listen to the SRS transmission and estimate a delay in receiving the signal against a common reference of time.

7. The system of claim 6 wherein the HSN nodes report the delay as metadata to the HNG.

8. The system of claim 7 wherein the HNG pinpoints the location of the UE and conveys this information to the E-SMLC as a location relative to the base station's location.

9. The system of claim 1 wherein the HSN node comprises a listen only base station for maintaining time synchronization and an arrival time of UE signals.

10. A method for providing base station localization, the method comprising:
   receiving, at a Hetnet Gateway (HNG) from an Evolved Serving Mobile Location Center (E-SMLC) server located in a network, a request for a location of a User Equipment (UE);
   issuing, by the HNG to a base station, instructions to schedule a Sounding Reference Signal (SRS) transmission for the UE;
   issuing, by the HNG, instructions to a plurality of Hyper Sync Network (HSN) nodes to listen for the SRS transmission from the UE;
   transmitting, by the UE at an appointed time, the SRS transmission;
   listening, by the HSN nodes, for the SRS transmission and estimating a delay in receiving the transmission against a reference time;
   reporting, by the HSN nodes, the delay as metadata to the HNG;
   determining, by the HNG from the metadata, a location of the UE relative a location of the base station; and
   reporting, by the e-SMLC, the location of the UE.

11. The method of claim 10 wherein the base station comprises a one of a 4G eNodeB and a 5G gNodeB (gNB).

12. The method of claim 10 further comprising hosting, by the HNG, location based services intelligence and algorithms.

13. The method of claim 10 further comprising keeping clocks on the base station and HSN nodes synchronized using a wireless channel.

14. The method of claim 10 wherein the HSN node comprises a listen only base station for maintaining time synchronization and an arrival time of UE signals.

15. A non-transitory computer-readable media containing instructions for providing base station localization which, when executed, cause a system to perform steps comprising:
   receiving, at a Hetnet Gateway (HNG) from an Evolved Serving Mobile Location Center (E-SMLC) server located in a network, a request for a location of a User Equipment (UE);
   issuing, by the HNG to a base station instructions to schedule a Sounding Reference Signal (SRS) transmission for the UE;
   issuing, by the HNG, instructions to a plurality of Hyper Sync Network (HSN) nodes to listen for the SRS transmission from the UE;
   transmitting, by the UE at an appointed time, the SRS transmission;
   listening, by the HSN nodes, for the SRS transmission and estimating a delay in receiving the transmission against a reference time;
   reporting, by the HSN nodes, the delay as metadata to the HNG;
   determining, by the HNG from the metadata, a location of the UE relative a location of the base station; and
   reporting, by the e-SMLC, the location of the UE.

16. The computer readable media of claim 15 further comprising instructions wherein the base station comprises a one of a 4G eNodeB and a 5G gNodeB (gNB).

17. The computer-readable media of claim 15 further comprising instructions for hosting, by the HNG, location based services intelligence and algorithms.

18. The computer-readable media of claim 15 further comprising instructions for keeping clocks on the gNB and HSN nodes synchronized using a wireless channel.

19. The computer-readable media of claim 15 further comprising instructions wherein the HSN node comprises a listen only base station for maintaining time synchronization and an arrival time of UE signals.

\* \* \* \* \*